No. 762,033. PATENTED JUNE 7, 1904.
J. T. FERRES.
APPARATUS FOR CORRUGATING PAPER.
APPLICATION FILED MAR. 6, 1903.
NO MODEL. 5 SHEETS—SHEET 1.
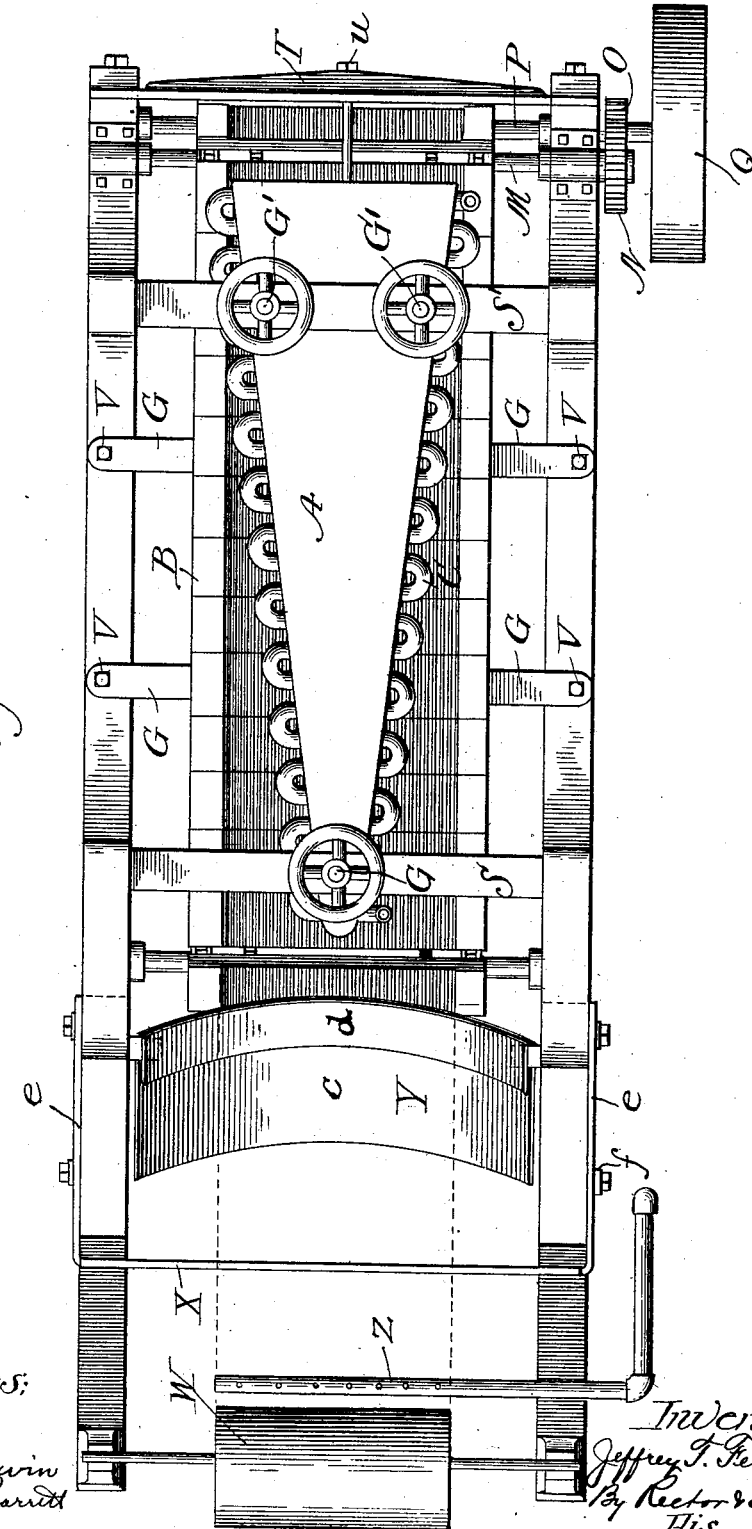

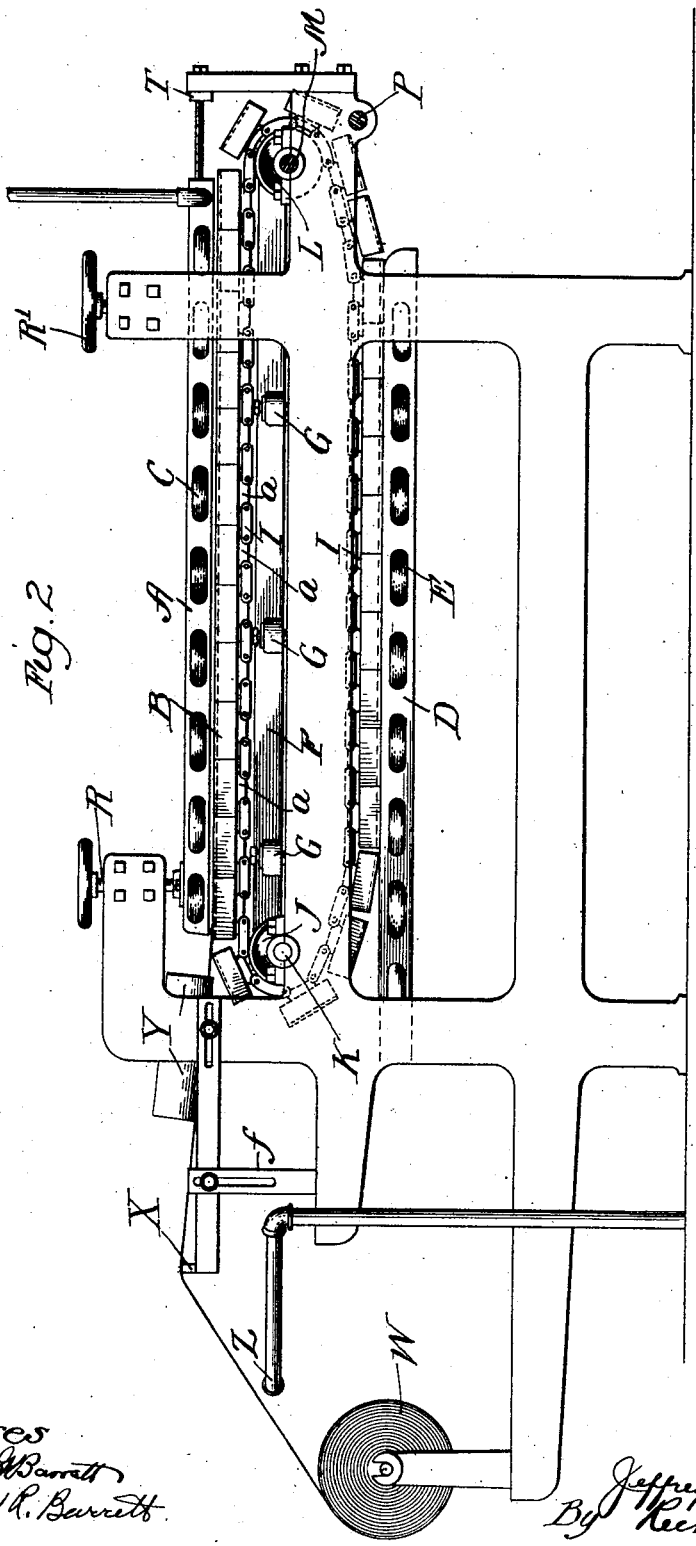

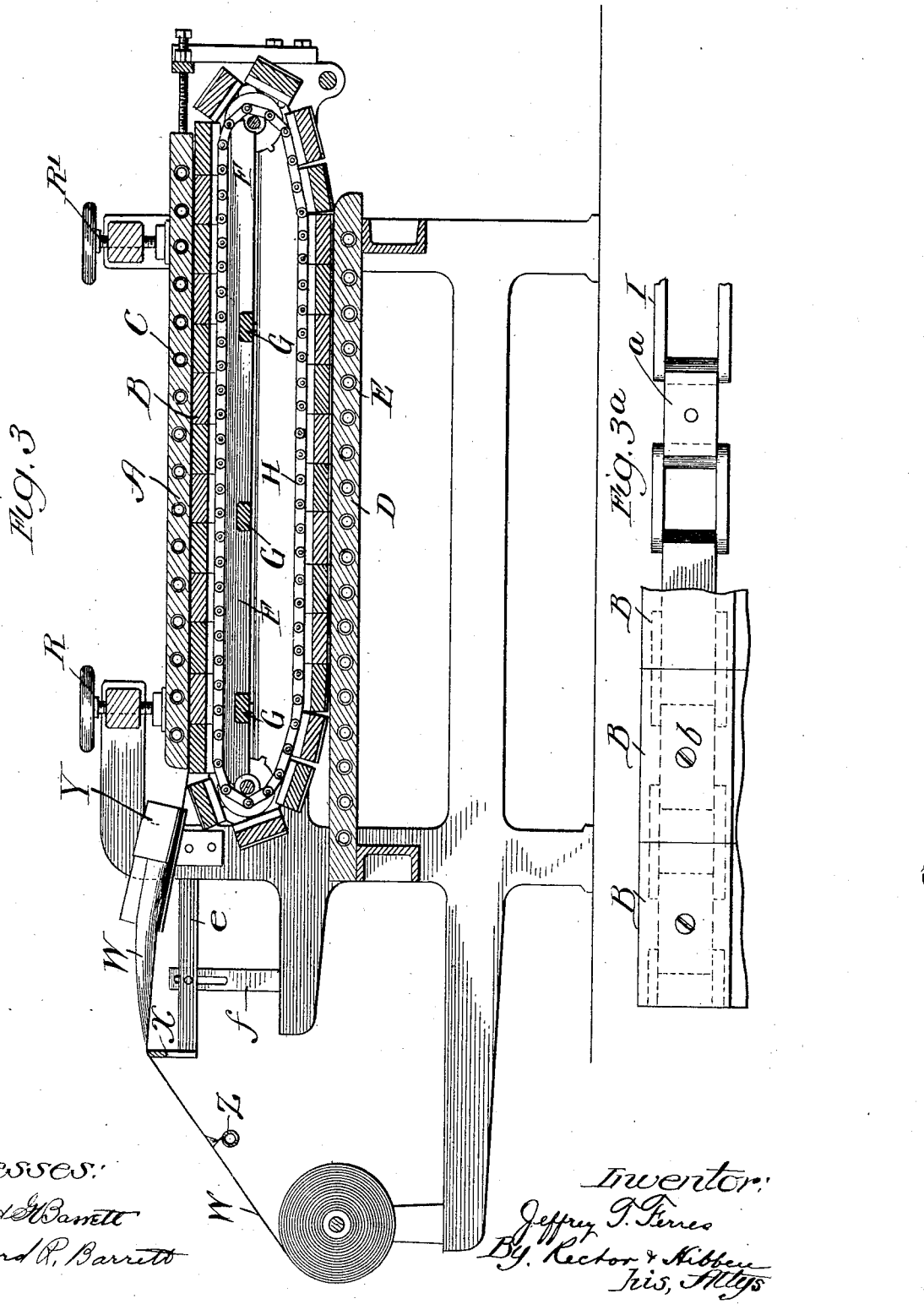

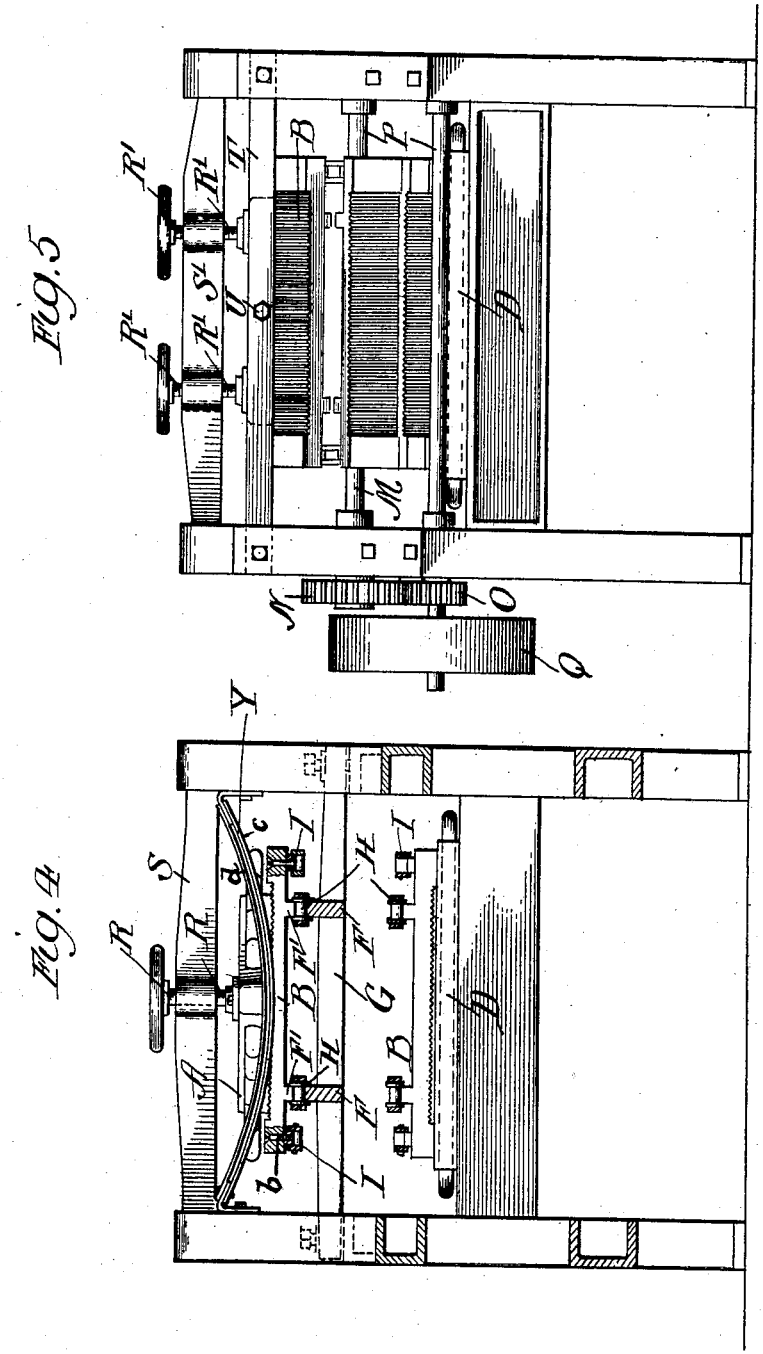

No. 762,033. PATENTED JUNE 7, 1904.
J. T. FERRES.
APPARATUS FOR CORRUGATING PAPER.
APPLICATION FILED MAR. 6, 1903.
NO MODEL.
5 SHEETS—SHEET 5.
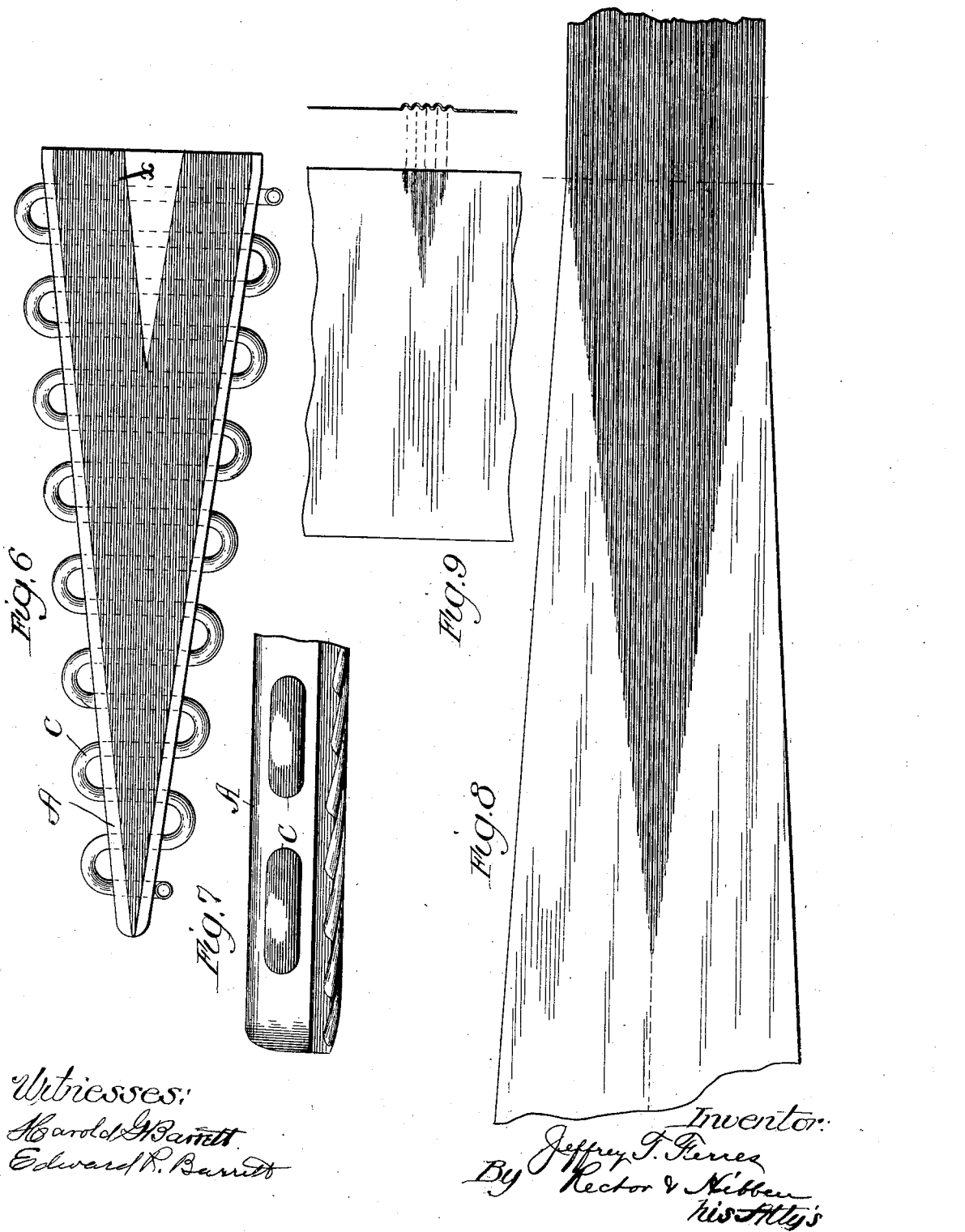

No. 762,033. Patented June 7, 1904.

UNITED STATES PATENT OFFICE.

JEFFREY T. FERRES, OF ANDERSON, INDIANA.

APPARATUS FOR CORRUGATING PAPER.

SPECIFICATION forming part of Letters Patent No. 762,033, dated June 7, 1904.

Application filed March 6, 1903. Serial No. 146,472. (No model.)

*To all whom it may concern:*

Be it known that I, JEFFREY T. FERRES, a citizen of the United States, residing at Anderson, in the county of Madison and State of Indiana, have invented certain new and useful Apparatus for Corrugating Paper, of which the following is a description, reference being had to the accompanying drawings, forming part of this specification.

My invention has for its object the production of a simple and efficient apparatus for corrugating paper longitudinally of the strip as distinguished from the ordinary operation of corrugating it transversely of the strip; and it consists in new constructions, combinations, and modes of operation of the parts making up my novel apparatus, which will be hereinafter explained and set forth in my claims.

In the accompanying drawings, Figure 1 is a top plan view of a machine or apparatus embodying my invention; Fig. 2, a side elevation thereof; Fig. 3, a middle longitudinal vertical section; Fig. 3ª, a detail view showing one of the chains to which the traveling apron or paper-carrier is secured; Fig. 4, an end elevation of the front end of the machine with part of the lagging forming the endless traveling belt or apron broken away to expose parts within it; Fig. 5, a view of the rear end of the machine; Fig. 6, a bottom plan view of the corrugating-former; Fig. 7, a detail in elevation of the front end of the same; Fig. 8, a top plan view of a piece of the strip of paper, showing the action of the corrugating apparatus upon it; and Fig. 9 an enlarged view of such strip, showing the beginning of the corrugations.

The primary elements of the machine are a longitudinally-corrugated former A, Fig. 1, and a coöperating longitudinally-corrugated traveling apron or paper-carrier B, by means of which the strip of paper to be corrugated is moved longitudinally through the machine and by the coöperation of which, with the former A, said strip is longitudinally corrugated.

The former A (or the corrugated working face thereof at least) is of tapering form, as shown in Figs. 1 and 6, while the longitudinal corrugations thereof run parallel with its longitudinal middle line, with the result that the series of corrugations extending forward from its rear end run out, so to speak, one by one along the tapering opposite edges of the former, Figs. 6 and 7, until at the extreme forward end of the latter only a few corrugations remain—in the present instance but a single one.

The longitudinal corrugations of the traveling apron or carrier B run parallel with the corrugations in the former A and intermesh with them, with the result that under the coöperation of the former A and carrier B the paper is drawn between them by the movement of the carrier. A single corrugation is first formed at the middle of the paper as the latter passes between the extreme forward end or point of the former and the carrier beneath, Fig. 9, and then successive corrugations upon either side of the longitudinal middle one are gradually formed as the carrier moves the paper on rearward beneath the former and passes it into the successive corrugations along the tapering edges of the latter. The strip of paper is thus gradually drawn inward toward its middle line and narrowed by the formation of the successive corrugations as it passes rearward through the machine, Fig. 8, until at its delivery from the rear end of the machine it may be contracted to the width of the working surface of the wide rear end of the former (or to a less degree, depending upon the depth to which the corrugations in the former A are set to mesh in the corrugations of the carrier B) and issue from the machine as a completely corrugated continuous strip of paper with the corrugations extending lengthwise of it.

The traveling apron or carrier B is composed of metal bars or lags extending transversely of the machine and fitting snugly against each other side by side and secured at their opposite ends to endless chains passing over supporting-wheels at the front and rear ends of the machine, the pair of wheels at the rear end of the machine being driven by suitable power to draw the upper side of the endless apron rearward through the machine.

The former A is heated by steam-coils C, passing transversely through and cast in it, while the carrier B is heated by a heater-plate D, suitably supported in the framework of the machine some distance below the former A and over the upper surface of which the under side of the carrier B travels in its passage from the rear end to the forward end of the machine. This heater-plate D is also heated by steam-coils E, passing transversely through and cast in it. The steam-coils may of course be arranged longitudinally of both the former and the heater-plate instead of transversely.

The corrugations in the transverse bars or lags making up the endless carrier B do not extend entirely to the end of such lags; but a smooth and slightly-raised surface is left at the opposite ends of the lags, Figs. 1, 4, and 5, which surfaces travel upon the upper side of the heater-plate D in the passage of the under side of the carrier over said heater-plate and support the corrugations out of contact therewith.

The upper side of the carrier B is supported in its travel rearward through the machine beneath the former A upon tracks or ways F F, Figs. 4 and 5, which tracks consist of longitudinal bars supported beneath the carrier upon transverse bars G, secured at their opposite ends to the framework of the machine, Fig. 1, the sets of bars F and G in the present instance, and preferably, being cast together in one integral frame or spider, composed of the two longitudinal bars F and the several transverse bars G.

The cross bars or lags of the carrier B do not rest directly upon the ways F F, but are provided upon their under side with transverse ribs F', which constitute longitudinal bearing-surfaces coincident with the tracks or ways F F and immediately above the latter. Interposed between these two bearing-surfaces is a roller-chain H, one at either side of the middle line of the machine, Figs. 3, 4, and 5, serving to relieve friction in the travel of the carrier B over the ways F.

At either side of the machine, outside of the roller-bearing chains H, are located the sprocket-chains I, to which the outer ends of the lags of the carrier B are secured and by which said carrier is moved through the machine. These sprocket-chains I pass at their forward ends around sprocket-wheels J, secured upon the opposite ends of the shaft K, journaled upon bearings upon the framework of the machine, and at their rear ends around the sprocket-wheels L, fast upon the shaft M, which has secured to one of its ends outside the framework of the machine a gear N, which meshes with a pinion O, fast upon the driving-shaft P of the machine, which shaft has secured upon it a driving-pulley Q, over which the driving-belt passes, Figs. 1 and 5.

The particular construction of the sprocket-chains I which I have employed in practice is shown in Fig 3ª, where it will be seen that the alternate links of the chain consist of rectangular plates or blocks $a$, each having a screw-hole at its center. The ends of the lags of the carrier B rests upon these blocks $a$ and are secured thereto by screws $b$, fitting in countersunk holes in the lags, Fig. 4, leaving the upper surfaces of the ends of the lags smooth and unobstructed, so that they may travel freely over the upper surface of the heater-plate in the forward travel of the under side of the carrier B, as before explained.

The former A is adjustably supported above the carrier B by a screw-rod R at its forward end and a pair of such rods R' R' at its rear end, said rods being provided with hand-wheels at their upper ends for turning them and the forward rod being passed through and supported by a cross-bar S of the framework and the rear rods by a cross-bar S' thereof.

The rear end of the former A abuts against a stop-bar T, extending across and secured to the oppoite sides of the framework, Fig. 1, the immediate contact of the rear end of the former being with the inner end of a set-screw U, passed forward through the middle bar T, by means of which the exact position of the stopping-abutment may be adjusted as desired.

Provision is made for vertical adjustment of the supporting tracks or ways F F of the carrier B, and consequently of the carrier itself, by means of the adjusting-screws V, passed through the opposite ends of the cross-bars G, which carry the tracks F and rest at their lower ends upon the side bars of the framework. (Shown in Figs. 1, 2, and 4.)

The roll of paper W which is to be corrugated is mounted in a suitable support at the forward end of the machine, Figs. 1, 2, and 3, and is led thence upward and rearward over a guide or straightening bar X and thence downward and rearward through a curved or concave guideway Y, whence it passes onward beneath the forward pointed end of the former A between the latter and the carrier B. The purpose of the curved guideway Y is to facilitate the initial corrugation of the middle portion of the strip by delivering it to the corrugating-surfaces beneath the pointed forward end of the former A in concavo-convex or trough-shape form in cross-section. The guideway may be constructed in any suitable manner, in the present instance consisting of a lower curved plate of sheet metal $c$ and an upper narrower and correspondingly-curved piece of sheet metal $d$, secured at its opposite ends above the rear portion of the piece $c$ and forming a curved guideway between them, Figs. 1 and 4.

The straightening-bar X, over which the strip of paper passes, is supported at its opposite ends by side arms $e$, bolted at their rear ends to the framework, and by standards $f$, to which the side arms e are bolted toward their forward ends. Provision for both vertical and backward and forward adjustment of the bar X is made by providing the side arms e and standards f with longitudinal slots, through which the bolts pass.

In its passage from the supply-roll W to the straightening-bar X the supply of paper is subjected to a steam-blast at Z for the purpose of moistening it, and thereby facilitating the action of the corrugating apparatus upon it.

The operation of the apparatus is as follows: The end of the strip of paper to be corrugated is led from the roll W upward and rearward over the bar X, through the curved guideway Y, and inserted between the forward end of the former A and corrugated carrier B, the end of the former being elevated by the screw R to permit such insertion and then lowered again to bring its corrugations into mesh with those upon the carrier B and grip the paper between them. The apparatus is then started, and the carrier B draws the paper rearward through the machine between the intermeshing corrugations of itself and the former A. At the extreme forward end or point of the former A there is but a single depending rib or corrugation, Figs. 6 and 7, which extends rearwardly along the middle line of the former. This rib or corrugation seats in a single groove in the upper side of the carrier B, so that at the first entrance of the paper between the carrier and the forward end of the former a single depressed curve or corrugation is formed along the middle line of the strip of paper, Fig. 9. As the paper is carried on rearward beneath the gradually-widening former another depending rib or corrugation of the former on each side of its middle one will come into mesh with the coincident grooves or corrugations in the carrier B and form two additional depressed corrugations in the strip of paper. As the paper moves on rearward beneath the former additional depending ribs or corrugations upon the under side of the latter and at each side of its middle line will come into mesh with the corresponding curves in the carrier B and draw down additional corrugations in the paper, with the result that the strip of paper will be gradually contracted in width as the successive corrugations are formed in it in its rearward passage through the machine, so that when it reaches and emerges from the rear end of the former it will be contracted and completely corrugated from side to side. In Fig. 8 I have illustrated a section of a strip of paper of sufficient length to show the action of the corrugating devices upon it from its first entrance between the pointed front end of the former and the corrugated carrier to its delivery in completely corrugated form at the rear end of the machine, from which view the manner in which the corrugating devices gradually act upon the strip of paper and contract its width as it passes through the machine will be readily understood.

The paper is heated and dried and its corrugations become firmly set by its passage between the heated former A and heated carrier B, and as it emerges from the rear end of the machine it may be cut into pieces of desired length for any purpose.

The forward end of each of the longitudinal ribs or depending corrugations of the former A is rounded off and sloped forward, as shown in Fig. 7, to facilitate initial engagement of the paper with such ribs or corrugations and the corresponding grooves or corrugations in the carrier beneath it, and thus avoid crumpling, tearing, or other mutilation of the paper which would interfere with its proper corrugation.

To relieve friction between the paper and the under side of the former A after the middle corrugations in the paper have become formed and set, I prefer to cut away some of the middle corrugations of the former at the rear portion of the latter, leaving an open V-shaped recess, as shown at x in Fig. 6. The cutting away of these corrugations correspondingly reduces the friction between the paper and the former at such point and in like proportion increases the preponderating frictional grip of the carrier upon the paper, which enables the carrier to more readily draw paper through the machine against the resistance offered to it by its frictional engagement with the under side of the former.

I claim—

1. In a machine for corrugating paper, the steam-heated former A having the longitudinal corrugations gradually increasing in number from its front end toward its rear end; substantially as described.

2. In a machine for corrugating paper, the former A provided with the longitudinal corrugations gradually increasing in number from its front toward its rear end, and having the steam-coils C cast in it; substantially as described.

3. In a machine for corrugating paper, the former A having the longitudinal corrugations gradually increasing in number from its front toward its rear end, and provided with the open recess x at the middle of its rear portion; substantially as described.

4. In a machine for corrugating paper, the former A having the longitudinal corrugations gradually increasing in number from its front toward its rear end, in combination with the longitudinally-corrugated carrier B composed of transverse bars or lags suitably hinged together; substantially as described.

5. In a machine for corrugating paper, the combination of the former A, the carrier B, and the heater-plate D over which the under side of the carrier B travels and by which it is heated during its forward movement; substantially as described.

6. In a machine for corrugating paper, the combination of the former A having the steam-coils C cast in it, the carrier B, and the heater-plate D having the steam-coils E cast in it and serving as a support and heater for the under side of the carrier B in its forward passage through the machine; substantially as described.

7. In a machine for corrugating paper, the combination of the former A, the carrier B having the longitudinal bearing-ribs F' upon its under side, the tracks or ways F F suitably supported beneath and coincident with the ribs F' F', and the roller-bearing chains H H interposed between the tracks F F and the bearing-surfaces F' F' of the carrier B; substantially as described.

8. In a machine for corrugating paper, the combination of the former A, the carrier B, the integral frame or spider composed of the transverse supporting-bars G and the longitudinal tracks or ways F F, and the roller-bearing chains H H interposed between said tracks and the carrier; substantially as described.

9. In a machine for corrugating paper, the combination of the former A and the carrier B, the latter composed of the transverse bars or lags and the endless chains I, said chains including alternate links consisting of blocks or plates $a$ $a$ to which the ends of the lags are secured by countersunk screws $b$; substantially as described.

10. In a machine for corrugating paper, the combination of the former A and carrier B, with means for adjusting the former A toward and from the carrier N; substantially as described.

11. In a machine for corrugating paper, the combination of the former A and carrier B, with means for adjusting the carrier B toward and from the former A; substantially as described.

12. In a machine for corrugating paper, the former A, adjustably supported by screw-rods R R' R', in combination with the carrier B; substantially as described.

13. In a machine for corrugating paper the combination of the former A, adjustably supported by the screw-rods R R' R', the stopping-bar T at the rear end of the former, and the carrier B; substantially as described.

14. In a machine for corrugating paper, the combination of the former A adjustably supported by the screw-rods R R' R', in combination with the carrier B adjustably supported beneath the former A by the transverse bars G and screws V; substantially as described.

15. In a machine for corrugating paper, the combination of the former A, carrier B and curved guide Y; substantially as described.

16. In a machine for corrugating paper the combination of the former A, carrier B, curved guide Y and steam-blast Z; substantially as described.

17. In a machine for corrugating paper the combination of the former A, carrier B, curved guide Y, straightening-bar X and steam-blast Z; substantially as described.

18. In a machine for corrugating paper, the combination of the supporting-roll for the paper W with the curved guideway Y for directing the strips of paper into the machine in curved cross-sectional form; substantially as described.

19. In a machine for corrugating paper, the former A having the longitudinal corrugations gradually increasing in number from its front end toward its rear end, and the front end of each depending corrugation being sloped or rounded off; as and for the purposes set forth.

JEFFREY T. FERRES.

Witnesses:
MRS. C. N. SMITH,
W. P. BENTON.